United States Patent [19]

Sakemi et al.

[11] Patent Number: 5,287,148

[45] Date of Patent: Feb. 15, 1994

[54] MAGNETIC SEAL FOR A DEVELOPING APPARATUS

[75] Inventors: Yuji Sakemi, Yokohama; Masahiro Itoh, Sagamihara; Akira Watanabe, Yokohama, all of Japan

[73] Assignee: Canon Kabushiki Kaisha, Tokyo, Japan

[21] Appl. No.: 727,547

[22] Filed: Jul. 9, 1991

[30] Foreign Application Priority Data

Jul. 10, 1990 [JP] Japan ................. 2-183172

[51] Int. Cl.$^5$ ........................................... G03G 15/06
[52] U.S. Cl. ................................... 355/245; 118/653; 355/215; 355/251
[58] Field of Search ............... 355/245, 215, 251, 253; 118/657, 658, 653

[56] References Cited

U.S. PATENT DOCUMENTS

| | | |
|---|---|---|
| 2,974,981 | 3/1961 | Vervest et al. ................. 286/1 |
| 3,783,828 | 1/1974 | Forgo et al. ................. 118/637 |
| 3,788,275 | 1/1974 | Hanson ................. 118/637 |
| 3,915,121 | 10/1975 | Wilcox ................. 118/637 |
| 4,213,617 | 7/1980 | Salger ................. 355/215 X |
| 4,341,179 | 7/1982 | Hosono et al. ................. 118/658 |
| 4,373,468 | 2/1983 | Suda et al. ................. 118/658 |
| 4,377,332 | 3/1983 | Tamura ................. 355/253 |
| 4,380,966 | 4/1983 | Isaka et al. ................. 118/651 |
| 4,387,664 | 6/1983 | Hosono et al. ................. 118/658 |
| 4,395,476 | 7/1983 | Kanbe et al. ................. 430/102 |
| 4,449,810 | 5/1984 | Ikesue et al. ................. 355/253 |
| 4,526,381 | 7/1985 | Ezekiel ................. 277/80 |
| 4,563,978 | 1/1986 | Nakamura et al. ................. 118/658 |
| 4,596,455 | 6/1986 | Kohyama et al. ................. 355/215 X |
| 4,597,661 | 7/1986 | Yamashita ................. 355/251 X |
| 4,748,474 | 5/1988 | Kurematsu et al. ................. 355/245 |
| 4,777,107 | 10/1988 | Kurematsu et al. ................. 130/122 |
| 4,806,971 | 2/1989 | Masham ................. 355/251 |
| 4,838,200 | 6/1989 | Hosoi et al. ................. 118/658 |
| 4,844,008 | 7/1989 | Sakemi et al. ................. 118/658 |
| 4,897,693 | 1/1990 | Sawayama ................. 355/215 |
| 4,933,254 | 6/1990 | Hosoi et al. ................. 430/122 |

FOREIGN PATENT DOCUMENTS

| | | |
|---|---|---|
| 0219233 | 4/1987 | European Pat. Off. . |
| 0314436 | 5/1989 | European Pat. Off. . |
| 0348138 | 12/1989 | European Pat. Off. . |
| 56-120819 | 9/1981 | Japan . |
| 57-30859 | 2/1982 | Japan . |
| 58-29479 | 6/1983 | Japan . |
| 59-170869 | 9/1984 | Japan . |
| 60-28673 | 2/1985 | Japan . |
| 60-151668 | 8/1985 | Japan . |
| 61-172173 | 8/1986 | Japan . |
| 62-70884 | 4/1987 | Japan . |
| 62-73283 | 4/1987 | Japan . |
| 63-61277 | 3/1988 | Japan . |
| 63-124075 | 5/1988 | Japan . |
| 64-08211 | 8/1989 | Japan . |
| 2-188292 | 7/1990 | Japan . |
| 2-262171 | 10/1990 | Japan . |

OTHER PUBLICATIONS

Xerox Disclosure Journal, vol. 11, No. 1, Jan./Feb. 1986, R. A. Lux, et al.: "Magnet For Toner Contamination Control."

Primary Examiner—A. T. Grimley
Assistant Examiner—Nestor R. Ramirez
Attorney, Agent, or Firm—Fitzpatrick, Cella, Harper & Scinto

[57] ABSTRACT

A developing apparatus for developing electrostatic images comprises a container for containing a developer comprising magnetic material. A rotatable member is provided which is rotatable in the container in contact with the developer, the rotatable member being supported on bearings. A stationary magnetic member is disposed out of position inside the container and adjacent to the bearing with a clearance from the rotatable member, the stationary member enclosing the rotatable member. The stationary member has first and second magnetic poles disposed adjacent to each other and having the same magnetic polarity to form a repelling magnetic field to form a magnetic brush of the developer in a clearance between the magnetic member and the rotatable member.

8 Claims, 3 Drawing Sheets

MAGNETIC SEAL FOR A DEVELOPING APPARATUS

FIELD OF THE INVENTION AND RELATED ART

The present invention relates to a developing apparatus for developing, with a developer comprising magnetic particles, an electrostatic latent image formed through an electrophotographic process, an electrostatic recording process or the like.

A developer container is provided with a rotatable developer carrying member in the form of a roller or a sleeve for carrying a developer to a developing zone for developing the latent image. A rotatable stirring member is provided such as a screw or a shaft with fins for stirring and conveying in the longitudinal direction the developer. Such rotatable members are supported by bearings mounted in side walls of the container.

In order to prevent the developer from leaking out of the longitudinal ends of the rotatable members, U.S. Ser. No. 499,729 proposes that a ferromagnetic member made of iron or the like is disposed at the end of the developer carrying member, and that a magnetic field is formed between the ferromagnetic member and a magnet disposed in the developer carrying member. The magnetic field forms a magnetic brush effective to prevent the developer from leaking at the end portions.

In order to prevent leakage at longitudinal ends of the stirring rotatable member, some proposals have been made and have put into practice. For example, a bushing or bearing contactable to the rotational shaft has been used; an elastic abutment member (oil seal) has been slidably contacted to the surface of the shaft to seal the developer, while supporting the bearings by bushings and bearings.

In the case of the example using the bushing, the sealing effect is good in the initial stage of use. However, with repeated use, the developer gradually enters between the sliding surfaces of the bushing and the shaft due to the pressure of the circulating developer. This results in the developer being fused and fixed there, thus increasing the driving torque and introducing coagulated developer into the container to deteriorate the image quality.

Similar defects are involved in the conventional structure using a bearing. Particularly in this case, the developer and the lubricant oil are fused and solidified together to prevent smooth rotation of the shaft.

In the case where an elastic abutment member (oil seal) is used, the developer sealing effect is much better than the above described conventional examples. However, in order to effect good sealing, the flatness and the eccentricity of the sliding surface of the shaft have to be very good. This increases the manufacturing cost and increases the possibility of coagulation of the developer at the sliding portion. With repetition of the sliding motion, the sliding surfaces are worn, and the developer circulating pressure deforms the sealing member, thus deteriorating the sealing effect. An additional problem is the relatively smaller durability. If the sliding surface area is increased in an attempt to increase the sealing effect, the required driving torque is significantly increased, and therefore, the increase thereof is limited.

In order to provide very fine images after development, the size of the developer is reduced, and in order to increase the developing power, an alternating electric field is applied in the developing zone, as disclosed in U.S. Pat. Nos. 4,933,254 and 4,395,476. For example, if the size of the toner is reduced to not more than 10 microns, or if a polyester resin material is used for the binder of the toner to provide a sharp fusing property suitable for the full color image formation, then the toner becomes easily coagulatable. In addition, the use of an alternating electric field promotes deposition of coagulated toner onto the developed images.

U.S. Pat. No. 3,788,275, Japanese Utility Model Application Publication No. 29479/1983 and Japanese Patent Application Publication 8211/1989 which issued from Japanese Laid Open Application 120819/1981 disclose prevention of developer leakage by use of a magnetic brush. In U.S. Pat. No. 3,788,275, a magnet ring is fixed in facing relation with the screw groove; in the Japanese Utility Model Application, a magnetic ring is fixed in facing relation with a rotational shaft made of non-magnetic material or weakly magnetic material. In the Japanese Patent Application Publication, the same magnetic polarity poles of the magnet ring fixed on the container and the magnetic ring fixed on the shaft are faced to produce a repelling magnetic field.

However, the sealing effect is not yet completely satisfactory.

SUMMARY OF THE INVENTION

Accordingly, it is a principal object of the present invention to provide a developing apparatus wherein leakage of the developer at the longitudinal ends of a rotatable member can be easily prevented without substantial increase of the driving torque.

It is another object of the present invention to provide a developing apparatus wherein coagulation of the developer attributable to the sealing member is prevented, so that an increase of the image quality is accomplished.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
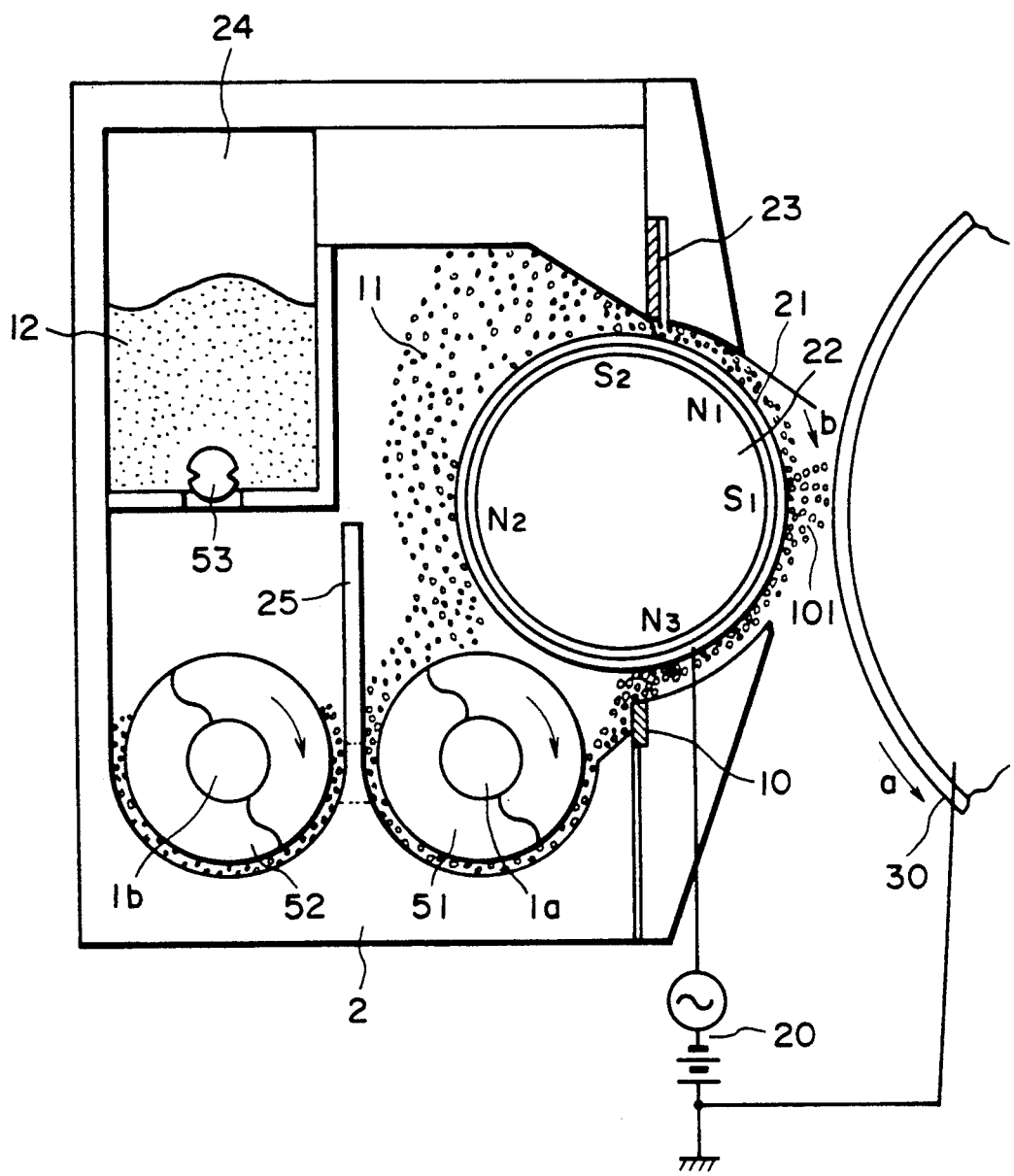
FIG. 1 is a sectional view of a developing apparatus usable with the present invention.

Referring to FIG. 1, there is shown a developing device includes a developer container 2 containing the developer 11. Within the developer container, there is disposed a developing sleeve 21 at an opening of the developer container 2. The developing sleeve 21 is rotatable in a direction b and carries the developer to a developing position 101 where the developing sleeve 21 is faced to the image bearing member 30 to develop the latent image. The sleeve 21 is made of a non-magnetic material such as aluminum, or non-magnetic stainless steel (SUS 316, for example). Within the sleeve 21, a stationary magnet roller 22 is disposed.

Above the developing sleeve 21, a blade 23 is mounted on the container 2 and forms a predetermined gap with the sleeve 21. The blade 23 functions as a developer layer limiting member for limiting the amount of the developer applied on the developing sleeve at the outlet of the container 2. The blade 23 is made of a non-magnetic material such as aluminum, or non-magnetic stainless steel (SUS 316, for example), or of a ferromagnetic material such as iron, nickel, cobalt or an alloy thereof. The dimension of the gap between the developing sleeve 21 and the blade 23 regulates the amount, and more particularly, the thickness of the developer carried on the developing sleeve 21 to the developing position. Therefore, in this embodiment, a developer comprising non-magnetic toner and magnetic carrier particles passes through the clearance between the tip end of the blade 23 and the surface of the developing sleeve 21, and it is supplied to the developing position 101.

Below the developing sleeve 21, that is, at the inlet of the developer into the container 2, a ferromagnetic member 10 is mounted on the container 2 and forms a predetermined gap with the sleeve 21. The member 10 is effective to form a magnetic field with a magnetic pole N3 of the magnet 22 to prevent developer from leaking out of the container 2 in a direction opposite to the rotational direction of the sleeve.

An in the prior art, developer is caught by a magnetic pole N2 and is conveyed by the rotation of the developing sleeve 21 to a magnetic pole S2 and to a magnetic pole N1. During this movement, the developes is regulated by the regulating member 23 into a thin layer. A developing magnetic pole S1 is effective to form a brush of the developer by the magnetic field thereby. The magnetic brush develops the electrostatic latent image on the image bearing member 30. Subsequently, the developer remaining on the developing sleeve 21 is forced to fall into the developer container 2 by a repelling magnetic field formed between the magnetic poles N3 and N2.

A DC biased AC voltage is applied the power source 20 to the sleeve 21, by which an, alternating field changes directions at the developing position. The toner and carrier particles are vibrated by the alternating electric field by the alternating electric field whereby the toner particles are released from confinement by the sleeve, and the carrier particles are deposited on photosensitive drum 30, corresponding to the latent image.

In the container 2, there are a first rotatable screw 51 and a second rotatable screw 52 to stir the developer 11 in the developer container 2 and to supply the developer to the developing sleeve 21. The first and second screws 51 and 52 are disposed substantially parallel in a longitudinal direction of the sleeve 21.

The screw 51 receives developer which has returned into the container 2 from the developing position 101 and has been released from the sleeve 21 due to the repelling magnetic field between the magnetic poles N2 and N3, and stirs the developer and conveys it in the longitudinal direciton of the sleeve.

The screw 52 stirs the developer 11 with fresh toner 12 supplied from a toner accommodating chamber 24 by the rotation of a toner supply roller 53, and the screw 51 conveys it in a direction opposite to the developer conveyance direction.

Between the screws 51 and 52, there is a partition wall 25 which is provided with openings adjacent opposite longitudinal ends of the screws. Through the openings, the developer is transferred from the screw 51 to the screw 52, or from the screw 52 to the screw 51. Thus, the developer 11 circulates within the container 2.

The developer stirred by the screws 51 and 52 is captured on the sleeve 21 by the magnetic force of the pole N2 from the neighborhood of the screw 51. The toner in the developer is triboelectrically charged to a polarity for developing the latent image by the friction with the carrier particles during the stirring operation.

The developer 11 is a two component developer comprising insulating and non-magnetic toner particles and magnetic carrier particles. The non-magnetic toner particles preferably have a weight average particle size of not less than 4 microns and not more than 10 microns. In this embodiment, a color copying machine toner having the weight average particle size of 8 microns is used.

The particle size distribution of the toner and the weight average particle size are measured, for example, in the following manner.

The measuring device includes a Callter Counter TA-II (available from Callter), to which an (Nikkaki) and CX-i Personal Computer (available from Canon Kabushiki Kaisha, Japan) for outputting number average distribution and weight average distribution are interfaced. As for the electrolytic solution, a first class natrium chloride is used to prepare 1% NaCl solution.

The electrolytic solution (100–150 ml) is mixed with 0.1–5 ml of a surface active agent (dispersing agent) (preferably alkylbenzene sulfonate) and further mixed with 0.5–50 mg of the material to be measured.

The electrolytic solution suspending the material is subjected to the dispersing operation approximately 1–3 min. using an ultrasonic dispersing device. Using the TA-II with a 100 micron aperture, the particle size distribution for particles having the particle size of 20–40 microns is obtained. From this distribution, the weight average particle size of the sample material can be obtained.

The toner contains binder resin, coloring agent and additives, as desired. It is preferable that hydrophobic colloidal silica fine particles are added to the toner.

Examples of the binder resin materials are styrene-acrylic acid-ester resin, styrene-methacryl acid-ester resin or other styrene copolymer or polyester resins. Particularly in the case of a color mixture in the fixing operation of the toner image by a non-magnetic color toner in an image forming apparatus, a polyester resin is preferable since it provides a sharp fusing property.

On the other hand, the magnetic carrier particles have a weight average particle size of 30−8 microns, preferably 40−7 microns. In this embodiment, the weight average particle size thereof is 50 microns. The volume resistivity thereof is preferably not less than $10^7$ ohm.cm, more preferably not less than $10^8$ ohm.cm, and most preferably $10^9$–$10^{12}$ ohm.cm. The carrier particles may be conveniently made of ferrite particles (maximum magnetization of 60 emu/g) or such particles with a thin coating of resin material.

The weight average particle size of the carrier particles may be determined in the following manner.

First, the particle size distribution of the carrier is determined in the following steps.

1. Weight of a sample (approximately 100 g) is measured to the order of 0.1 g.

2. Standard screens of 100 mesh, 145 mesh, 200 mesh, 250 mesh, 350 mesh and 400 mesh are stacked with a pan at the bottom. The sample is supplied on the top filter, and it is covered.

3. Then the sample is vibrated by a vibrator at the frequency of 285±6 per minute (in a horizontal plane) and at the frequency of 150±10 (impacts) for 15 minutes.

4. Weights of the screens and the pan are measured to the order of 0.1 g.

5. The weight percentages are calculated to the order of 0.01, and the values are rounded to the order of 0.1 in accordance with JIS-Z 8401.

The frame of the screen has an inside diameter of 200 mm above the screen, and the depth from the screen to the top of the frame is 45 mm.

The total of the weights of the carrier particles must be more than 99% of the original weight of the sample.

The average particle size is determined by the following equation:

Average particle size (micron) = 1/100 × [(weight on the 100 mesh screen) × 149 + (weight on the 145 mesh screen) × 122 + (weight on the 200 mesh screen) × 90 + (weight on the 250 mesh screen) × 68 + (weight on the 350 mesh screen) × 52 + (weight on the 400 mesh screen) × 38 + (weight having passed through all the screens) × 17].

The percentage of the carrier particles less than 500 mesh is determined by placing a 50 g sample on a 500 mesh standard screen, and it is sucked from the bottom, and the percentage is calculated by the reduction of weight.

The volume average of the magnetic carrier particles, for example, ferrite particles or resin coated ferrite particles is determined in the following manner. A sandwich type cell having a measuring electrode area of 4 cm$^2$ and a clearance of 0.4 cm between the electrodes is used. The pressure of 1 kg is applied to one of the electrodes, and a voltage E (V/cm) is applied between the electrodes. The resistance of the magnetic particles is determined from the current through the circuit.

Figure 2:
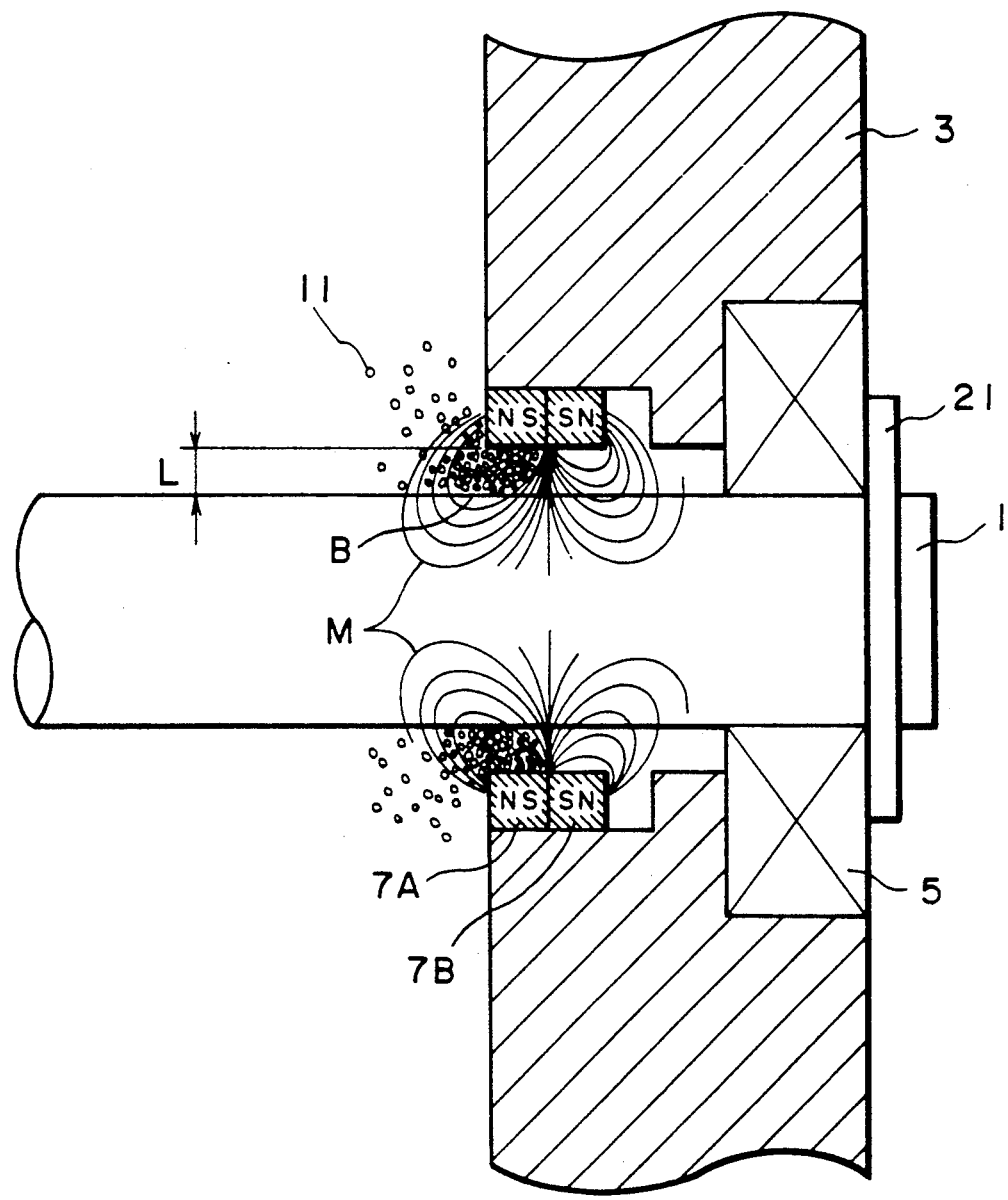
FIG. 2 is a sectional view of a major part of a developing apparatus according to an embodiment of the present invention.

In this embodiment, the direction of magnetization of the cylindrical magnets 7A and 7B is parallel with the axis (longitudinal direction) of the rotational shaft 1. In the magnet 7A, there are an n-pole and an s-pole in the order named from the inside in the direction of the thickness of the magnet (the longitudinal direction of the shaft 1). In the magnet 7B, there are an s-pole and an n-pole in the order named. Thus, the magnets 7A and 7B are mounted on the side walls 3 in the manner that the same magnetic poles are faced to each other. The magnets may be bonded to each other with bonding material or may be spaced from each other with a small gap. In FIG. 2, the s-pole of the magnet 7A and the s-pole of the magnet 7 B are arranged opposed to each other, but the n-pole of the magnet 7A and the n-pole of the magnet 7 B may be arranged opposed to each other.

In any case, the same polarity poles are arranged opposed to each other to each other, and therefore, a strong magnetic field is formed therebetween. The repelling magnetic field between the magnets 7A and 7B is effective to bias the magnetic lines M of force extending from the magnet 7A which is disposed more inside than the magnet 7B, toward the inside from the boundary between the magnets in the direction of the axis of the non-magnetic rotatable member. The magnetic carrier particles are confined along the magnetic lines M, so that a magnetic brush B is formed between the cylindrical magnet and the non-magnetic shaft, extending from the neighborhood of the boundary between the cylindrical magnets 7A and 7B. The magnetic brush B is dense and made of the developer 11 confined on the cylindrical magnet and is extended mainly adjacent the inside in the longitudinal direction of the non-magnetic shaft from the boundary between the magnets 7A and 7B.

The magnetic brush B extends in the direction of the shaft from the cylindrical magnet uniformly in the circumferential direction in contact with the shaft. The density of the magnetic lines of force is highest adjacent the junction between the cylindrical magnets 7A and 7B. In addition, the direction of the magnetic lines is codirectional with the non-magnetic shaft. And therefore, the magnetic field locally concentrated to the clearance between the cylindrical magnets 7A and 7B provides a magnetic seal. Since the magnetic field from the magnetic field generating means fixed along the circumference of the shaft with a clearance therefrom, is locally concentrated so that the magnetic field extends toward the central portion of the shaft. Therefore, the mechanical stress to the developer can be suppressed, and the leakage of the developer toward the bearing can be prevented.

As described, the magnetic field is locally concentrated to effect the sealing, and therefore, the sealing is assured. However, since the density of the magnetic brush confined on the magnetic lines of force is very high, a degree of latitude of the brush is required between the shaft and the cylindrical magnet. If the distance between the shaft and the cylindrical magnet is too small, the relative motion between the non-rotating magnetic brush B and the shaft becomes non-smooth, and when the shaft is rotated, the friction between the shaft and the magnetic particles or the friction among the carrier particles is increased. If the toner is a usual one, the stress of this degree is not influential. But, when the toner comprises polyester resin material, to provide sharp fusing property in the case of forming a full color image by superposing plural color toners, the friction between the toner and the shaft and among the magnetic carrier particles, when the relative motion between the magnetic brush B and the shaft, fuses the toner, and a coagulated toner mass is formed therearound. The mass enters the middle of the container, and deteriorates the image quality.

As a result of various experiments and investigations, it has been found that there is a close relation between the proper clearance L between the outer periphery of the shaft 1 and the inner periphery of the cylindrical magnet 7A and 7B and the average particle size of the magnetic carrier particles. More particularly, it is preferable that L > 5d, and it is most preferable that L > 10d, where d is a weight average particle size of the carrier particles. If the clearance L is smaller than this, the relative movement between the magnetic brush B and the shaft deteriorates with the results of toner fusing and defects on the resultant image. In addition, it has been found that the shape of the carrier particles (magnetic) is preferably spherical, since then the stress to the toner is small. Here, spherical means a shape having a ratio of a long axis length to a short axis length, which is not more than 3, and not having a projection. These conditions are effective in the case not using a sharp fusing property.

According to the embodiment of the present invention, sealing is effected by the magnetic brush B, and therefore, developer or toner separated from the carrier particles will possibly be leaked toward the outside of the seal, if 500,000 images, for example, are continuously formed, although the amount the of leakage is small. However, the amount of the leaked material is not such that fusing occurs or that the rotation of the bearing is stopped.

The latitude relative to the whirling of the shaft due to the play between the shaft and the bearing is larger than the conventional structure. Since, however, the magnetic field is locally concentrated to effect the sealing, the pressure between the brush and the shaft may be increased upon reduction of the clearance, if the whirling is large. If this occurs, the developer may be fused with the result of deterioration of the resultant image.

As a result of various experiments and investigations, it has been found preferable that $\Delta L < 6d$ is satisfied, where $\Delta L$ is the maximum of the variation of the distance between the cylindrical magnet and the shaft 1 at any position of the cylindrical magnet, and d is a weight average diameter of the carrier particles.

The surface magnetic density at the surface of the magnets 7A and 7B is preferably not less than 600 gausses, when, for example, the cylindrical magnet has an inside diameter of 10 mm, an outside diameter of 13 mm and a thickness of 2 mm, and when the maximum magnetic energy multiple (BxH)max of the magnet is required to be 7.0 (MGOe). This has been accomplished by using a plastic magnet comprising rare earth metal powder bound by plastic material.

Figure 3:
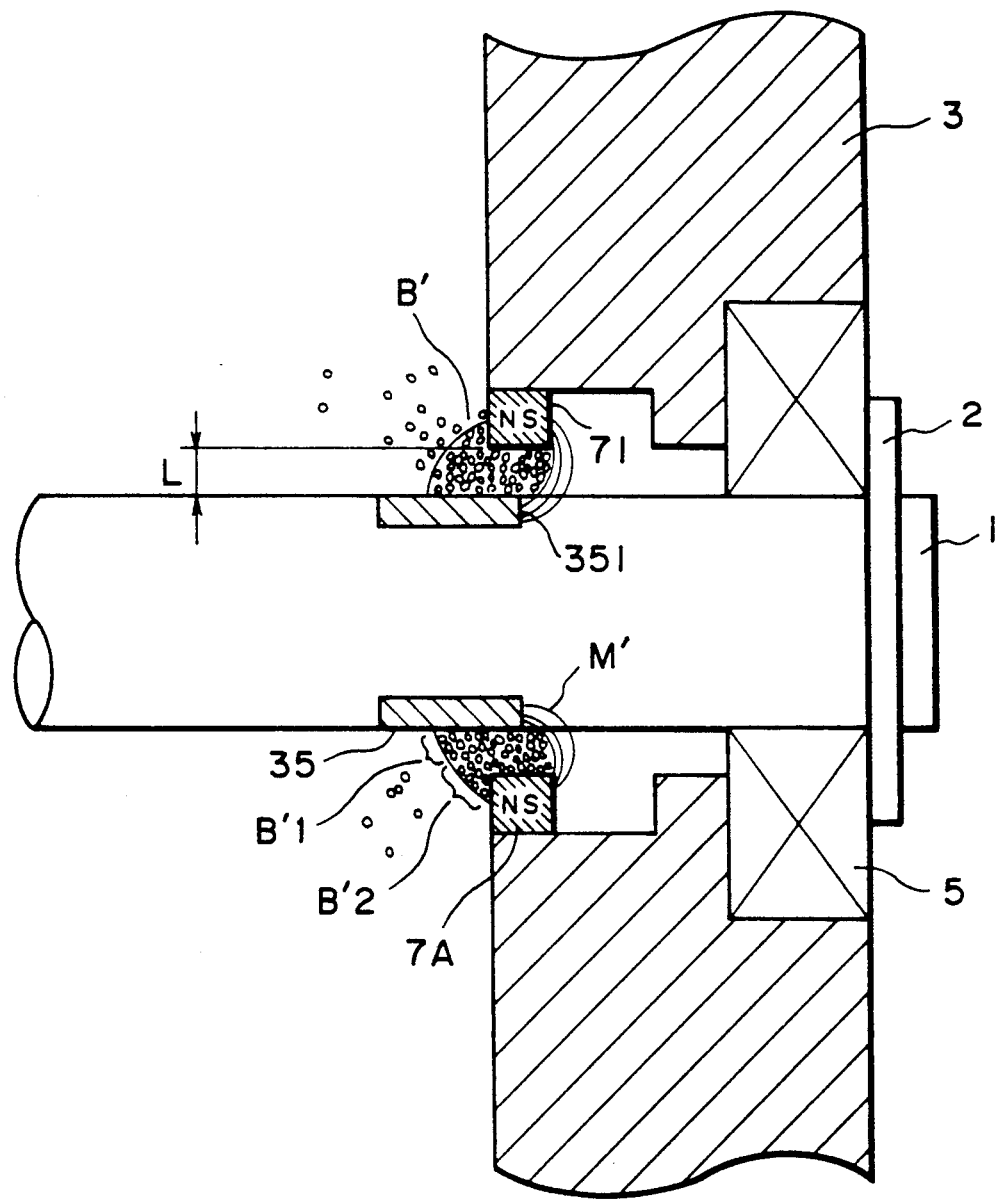
FIG. 3 is a sectional view of a major part of a developing apparatus according to an embodiment of the present invention.

FIG. 3 shows another example, wherein only one magnet ring enclosing a circumference of the shaft 1, is fixed on the side wall 3 of the container at the inside thereof; and a ring 35 of ferromagnetic material such as iron, cobalt, nickel or alloy thereof is fixed on the shaft in a range in which the magnetic field of the magnet ring 7A is influential. The ferromagnetic material has $(\frac{1}{2}) \times (BH)max$ which is not more than 0.7 J/m³, where (BH)max is the maximum of the multiple of B and H (maximum energy multiple), where B is residual magnetic flux density, and H is coercive force.

Between the magnetic pole of the magnet 7A and the magnetic material ring 35, a concentrated magnetic field is formed, and the concentrated magnetic field is effective to provide a magnetic brush B' between the shaft 1 and the magnet 7a, so that the leakage of the developer is prevented.

The magnetic brush B' includes a portion B'1 rotatable together with the shaft 1 and a portion B'2 confined on the magnet 7A and substantially non-rotatable together therewith. The portions B'1 and B'2 slide relative to each other at the boundary therebetween, but they are both flexible, and therefore, the mechanical stress is small, and the coagulation production is suppressed.

The bearing 5 side end 351 of the ends of the magnetic material ring 35 in the longitudinal direction of the shaft 1 is more inside of the container 29 in the longitudinal direction than the bearing 5 side end 71 of the magnet ring in the longitudinal direction of the shaft 1. Therefore, the magnetic lines M' of the magnet 7A are biased toward the inside of the container from the position of the magnet 7A. So, the magnetic brush B' is more biased toward the inside of the container from the position of the magnet 7A, and therefore, the leakage of the developer to the bearing 5 can be more effectively prevented.

In this embodiment, it is also preferable that $L > 10d$, and $\Delta < 6d$. The toner and carrier particles may have the diameters described herein before. In addition, the carrier particles are preferably spherical, as described hereinbefore.

FIGS. 2 and 3 shows only one of the ends of the shaft 1. But, the same structure may be used for the other end.

In the foregoing embodiment, two component developer is used, but the present invention is applicable to a one component developer mainly comprising toner having magnetic particles such as magnetite particles bound by synthetic resin materials. In the case of a one component developer, the present invention is particularly effective when the volume average particle size of the toner is not more than 10 microns.

The present invention is also applicable to a developing sleeve 21, as will be understood from the foregoing description.

As described in the foregoing, according to the present invention, the sealing magnetic field is concentrated very locally, and therefore, the adverse affects of coagulated developer are prevented, with a good sealing effect maintained. In addition, durability is increased without increasing the required torque for the shaft 1 and without damage to the bearing.

While the invention has been described with reference to the structures disclosed herein, it is not confined to the details set forth and this application is intended to cover such modifications or changes as may come within the purposes of the improvements or the scope of the following claims.

What is claimed is:

1. A developing apparatus for developing an electrostatic latent image, comprising:
   a container for containing a developer comprising magnetic material;
   a rotatable member rotatable in said container in contact with the developer, said rotatable member being supported on bearings; and
   a stationary magnet member disposed at a position inside of said container and adjacent to the bearing with a clearance from said rotatable member, said stationary magnet member enclosing said rotatable member and being magnetized in a longitudinal direction of said rotational member;
   wherein said rotatable member has a ferromagnetic member faced to said stationary magnet member, wherein an end of said ferromagnetic member adjacent the bearing is arranged further inside of said container than an end of said stationary magnet member adjacent the bearing and is enclosed by said stationary magnet member, and wherein a magnetic brush of the developer is formed in a clearance between said stationary magnet member and said rotatable member by a magnetic field formed between said stationary magnet member and said ferromagnetic member.

2. An apparatus according to claim 1, wherein said rotatable member comprises a developer stirring member.

3. An apparatus according to claim 2, wherein the developer is a two component developer comprising toner particles having an average particle size of 4–10 microns and magnetic carrier particles having an average particle size of 30–80 microns.

4. An apparatus according to claim 3, wherein the clearance is larger than the average particle size of the magnetic carrier particles by a factor of 10.

5. An apparatus according to claim 3, wherein the magnetic carrier particles are spherical.

6. An apparatus according to claim 2, wherein the developer is a one component developer.

7. An apparatus according to any one of claims 1-6, further comprising a developer carrying member for carrying the developer to a developing zone for developing the electrostatic latent image; and a power source for applying a bias voltage to said developer carrying member to form an alternating electric field in the developing zone.

8. An apparatus according to any one of claims 1-6, wherein said magnetic brush includes a rotatable portion supported on said rotatable member and rotating in accordance with a rotation of said rotatable member and a substantially stationary portion supported and confined by said stationary magnet member.

* * * * *

UNITED STATES PATENT AND TRADEMARK OFFICE
CERTIFICATE OF CORRECTION

PATENT NO. : 5,287,148
DATED : February 15, 1994
INVENTOR(S) : SAKEMI ET AL

It is certified that error appears in the above-indentified patent and that said Letters Patent is hereby corrected as shown below:

On the title page, item [56] References Cited; change "64-08211 8/1989 Japan" to --64-08211 1/1989 Japan--.

Column 1, line 17, change "direction" to --direction of--.
         line 31, "have" to --have been--.
Column 2, line 57, change "device" to --device which--.
Column 3, line 27, change "An" to --As--.
         line 45, delete "by the alternating electric field".
         line 60, change "direciton" to --direction--.
Column 5, line 57, delete "to each other" (second occurrence).
Column 8, line 4, change "shows" to --show--.
         line 19, change "affects" to --effects--.

Signed and Sealed this

Fourth Day of October, 1994

Attest:

BRUCE LEHMAN

Attesting Officer        Commissioner of Patents and Trademarks